US008489547B2

(12) United States Patent
Ayachitula et al.

(10) Patent No.: US 8,489,547 B2
(45) Date of Patent: Jul. 16, 2013

(54) SYSTEM AND METHOD FOR TRANSFORMING CONFIGURATION DATA ITEMS IN A CONFIGURATION MANAGEMENT DATABASE

(75) Inventors: Naga A. Ayachitula, Yorktown Heights, NY (US); Melissa J. Buco, Yorktown Heights, NY (US); Krishna S. Garimella, Menlo Park, CA (US); Lalitha P. Kamesam, Cortlandt Manor, NY (US); David Loewenstern, Yorktown Heights, NY (US); Larisa Shwartz, Yorktown Heights, NY (US); Maheswaran Surenda, Yorktown Heights, NY (US); Christopher Ward, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/512,733

(22) Filed: Jul. 30, 2009

(65) Prior Publication Data

US 2011/0029767 A1 Feb. 3, 2011

(51) Int. Cl.
*G06F 17/00* (2006.01)
(52) U.S. Cl.
USPC ........................................ 707/610

(58) Field of Classification Search
USPC .................... 707/602, 610, 617, 999.201
See application file for complete search history.

(56) References Cited

U.S. PATENT DOCUMENTS

| 2007/0288281 | A1* | 12/2007 | Gilbert et al. ................ 705/8 |
| 2008/0209398 | A1* | 8/2008 | Aikens et al. ................ 717/121 |
| 2008/0313331 | A1* | 12/2008 | Boykin et al. ................ 709/226 |
| 2009/0012981 | A1* | 1/2009 | Kogoh ........................ 707/101 |
| 2009/0112860 | A1* | 4/2009 | Yuasa et al. ................. 707/6 |
| 2009/0144319 | A1* | 6/2009 | Panwar et al. ............... 707/102 |
| 2010/0131473 | A1* | 5/2010 | Bjork et al. .................. 707/690 |
| 2010/0306275 | A1* | 12/2010 | Maheshwari et al. ....... 707/803 |
| 2011/0161288 | A1* | 6/2011 | Morimoto et al. .......... 707/611 |

* cited by examiner

*Primary Examiner* — Mohammed R Uddin
(74) *Attorney, Agent, or Firm* — F. Chau & Associates, LLC; Louis J. Percello, Esq.

(57) ABSTRACT

A system, method and apparatus for performing information transformations on an information stream composed of configuration items (CIs) for improving data quality and extending the capabilities of a configuration management database (CMDB). In one embodiment the data transformations ensure that a CMDB can be used to manage environments that use Network Address Translation by the modification of the signatures of analyzed CIs so that the resulting set of CIs is unique. The modification is applied to augment the signature with a domain specific prefix so that, when loaded into the enterprise wide CMDB, a CI is uniquely identified.

12 Claims, 12 Drawing Sheets

```
</fileSystem>
<ipInterfaces array="1"
 guid="1B0931459539F8E9AD2D306A24E80EA"
 lastModified="1187724132273"
 parent="D70D69F258DA3E558AE95EBC34E371FF" xsi:type="coll:com.collation.platform.model.topology.net.IpInterface".
    <CDMSource>gdrd23</CDMSource>
    <displayName>unknown</displayName>
    <bidFormat>ILYNN</bidFormat>
    <ipAddress
     guid="5C0885A1E81F3D8984668632D3E84D88"
     lastModified="1187724132274" xsi:type="coll:com.collation.platform.model.topology.net.IpAddress">
        <CDMSource>gdrd23</CDMSource>
        <displayName>4.0.0.0</displayName>
        <bidFlag>3</bidFlag>
        <bidFormat>ILYNN</bidFormat>
        <dotNotation>4.0.0.0</dotNotation>
    </ipAddress>
</ipInterfaces>
<physicalPackage
 guid="9B7C47DE405B3D0EACB717386F63CD69"
```

FIG. 6A

```
<ipAddress
 guid="6F542F42BC6E3DF08F9FE2E93A8C790D"
 lastModified="1187732301733" xsi:type="coll:com.collation.platform.model.topology.net.IpAddress">
  <CDMSource>producers</CDMSource>
  <displayName>4.0.0.0</displayName>
  <CDMSource>9.2.252.100</CDMSource>
  <sourceToken>5C0885A1E81F3D8984668632D3E84D88</sourceToken>
  <bidFlag>3</bidFlag>
  <bidFormat>ILYNN</bidFormat>
  <addressSpace>9.9.9.9</addressSpace>
  <dotNotation>4.0.0.0</dotNotation>
</ipAddress>
</ipInterfaces>
<physicalPackage
```

SYSTEM AND METHOD FOR TRANSFORMING CONFIGURATION DATA ITEMS IN A CONFIGURATION MANAGEMENT DATABASE

FIELD OF THE INVENTION

The present disclosure is directed to the field of information technology (IT) Service Management, and relates, in particular, to the transformation of configuration items for quality and compliance purposes as they are loaded into a Configuration Management Database (CMDB).

BACKGROUND OF THE INVENTION

In any managed infrastructure environment, such as an information technology (IT) infrastructure environment, one of the challenges is to maintain an accurate representation of the configuration of this environment for the benefit of management functions and processes. This notion is well appreciated among IT professionals and has led to the development of best practices for the representation of configuration item (CI) information in selected management domains. CIs comprise all infrastructure resources that are in under the management of or whose control is governed by an IT service management configuration process. Examples of CIs and CI types include computer systems, operating systems, applications, business services, routers, and switches, printers, etc. A computer system is a CI type: for example, server01.watson.ibm.com and gdil_server_2.watson.ibm.com are CIs instances of type ComputerSystem. CIs are uniquely identified in such environments by the use of naming rules (or keys). For example, in the IT domain one such practice is expressed by the IT Infrastructure Library (ITIL) in which a Configuration Management Database (CMDB) and a plurality of Configuration Management processes are defined. The CMDB can be either a unified database or a federated database where a collection of databases presents a single user interface. The CMDB stores configuration items (CIs) and their attributes and details about the relationships between CIs. Information that is stored within a CMDB is accessible by one or more system/service management applications to accomplish their task.

One challenge in the realization of such a CMDB is the representation of information from a variety of infrastructure environments that may have overlapping or duplicate keys as a result of systemic considerations in the managed environment. An exemplary environment would one in which Network Address Translation (NAT) is used, resulting in several resources appearing to have the same Internet Protocol (IP) address when inspected (or discovered) within the environment and viewed across the enterprise as a whole. In such circumstances, an enterprise-wide CMDB could be populated by configuration details from a number of resources with undistinguishable keys. This results in data integrity problems within the enterprise-wide CMDB for these configuration items.

SUMMARY OF THE INVENTION

Exemplary embodiments of the invention as described herein generally include methods and systems for performing data transformations on an information stream composed of configuration items (CIs). These transformations may be used to improve the data quality and extend the capabilities of a CMDB. In one embodiment of the invention, the data transformations are used to ensure that a CMDB can be used to manage environments that make use of Network Address Translation (NAT) by the modification of the signatures of analyzed CIs so that the resulting set of CIs have unique network addresses. The modification applied is to augment the signature with a domain specific prefix so that, when loaded into the enterprise wide CMDB, the CI is uniquely identified.

According to an aspect of the invention, there is provided a method for transforming information technology (IT) infrastructure configuration items (CIs), including providing an information stream of CIs from a configuration management database (CMDB), and applying a set of transformation rules to the CIs in the information stream, where the transformation rules are customized to the CIs, where transforming a CI comprises augmenting the CI with additional information where the CI is adapted to be effectively identified and manipulated within the CMDB.

According to a further aspect of the invention, applying a set of transformation rules comprises reading a job plan that provides details on those CIs to be transformed, pulling from a source configuration management database (CMDB) a CI for transformation, applying one or more transformation rules to the CI, and pushing the transformed CI onto a target CMDB.

According to a further aspect of the invention, the method includes comparing the CI to one of the one or more transformation rules, and if the CI matches the transformation rules based on the job plan and a profile definition of which CI types are to be transformed, applying the set of transformation rules to the CIs.

According to a further aspect of the invention, the method includes searching in the target CMDB for all CIs that refer the transformed CI, and updating the CI references in the target CMDB with the transformed CI.

According to a further aspect of the invention, the CI is defined by a schema and represented by an eXtensible Markup Language (XML) file, and where augmenting the CI comprises adding records to the XML file.

According to a further aspect of the invention, the method includes storing a globally unique identifier of the CI in the CMDB, where the CI is locatable within the CMDB.

According to another aspect of the invention, there is provided a method for correcting data integrity problems in an information technology (IT) infrastructure configuration management database (CMDB) in a Network Address Translation environment, including pulling an information stream of configuration items (CIs) from a source CMDB, applying one or more transformation rules to a configuration item (CI) in the information stream that augment an IP address for the CI in the source CMDB with domain specific information, and pushing the augmented CI into a target CMDB.

According to a further aspect of the invention, the method includes searching in the target CMDB for all CIs that refer the transformed CI, and updating the CI references in the target CMDB with the transformed CI.

According to a further aspect of the invention, the transformed CI is referred by a candidate key in the source CMDB.

According to a further aspect of the invention, the transformed CI is referred by a globally unique identifier in the source CMDB.

According to a further aspect of the invention, transforming a CI comprises augmenting the CI with additional information so that a globally unique identifier of the CI in the source CMDB is stored, where the CI is locatable within the original source CMDB.

According to another aspect of the invention, there is provided a program storage device readable by a computer, tangibly embodying a program of instructions executable by the computer to perform the method steps for transforming information technology (IT) infrastructure configuration items (CIs).

According to another aspect of the invention, there is provided a program storage device readable by a computer, tangibly embodying a program of instructions executable by the computer to perform the method steps for correcting data integrity problems in an information technology (IT) infrastructure configuration management database (CMDB) in a Network Address Translation environment.

DETAILED DESCRIPTION OF EXEMPLARY EMBODIMENTS

Exemplary embodiments of the invention as described herein generally include systems and methods for the transformation of configuration items for quality and compliance purposes as they are loaded into a Configuration Management Database (CMDB). Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Figure 1:
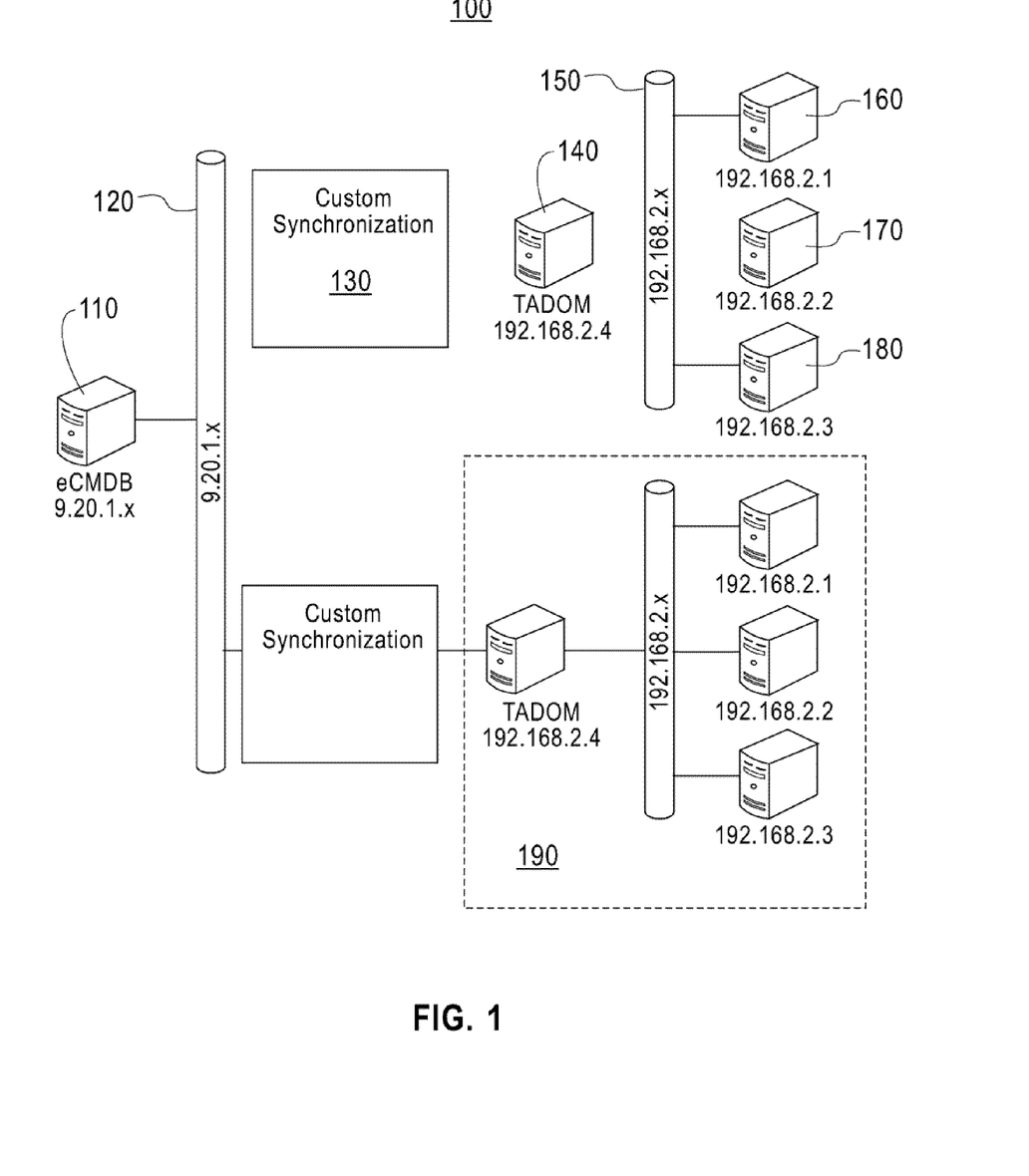
FIG. 1 depicts an exemplary CMDB managed environment with a custom synchronization capability, according to an embodiment of the invention.

According to an embodiment of the invention, a custom synchronization mechanism is developed that can synchronize objects from specific CMDB instances to a central repository. The custom synchronization mechanism can annotate IP addresses with appropriate scoping information. FIG. 1 depicts an exemplary CMDB managed environment with a custom synchronization capability. A transformation synchronization is used to transform data from one CMDB and place the results into another CMBD. FIG. 1 shows a managed environment 100 with an enterprise CMDB (or eCMBD) 110 which is the defined repository of the configuration of an environment populated with data from a number of domain-specific CMDB instances (or dCMDBs) 140. The domain specific CMDB 140 instances reside in locales so that the data that they collect (or discover) has no integrity problems. As shown in FIG. 1, the dCMDB 140 is connected over a network 150 to a number of platforms 160, 170, 180. The enterprise CMDB 110 is connected to the dCMDBs via a network 120 in which resides the custom synchronization transformation mechanism 130. The custom synchronization 130 function is responsible for populating the enterprise CMDB 110 from the domain CMDBs 140 and ensures the integrity of the data within the enterprise CMDB 110 by applying a transformation to the CIs as they are written to the enterprise CMDB. FIG. 1 further shows that the eCMDB 110 may be populated by any number of additional similar systems 190 comprising a dCMDB, a network, servers, and the associated custom synchronization systems applying transformations to CIs in the domains in which NAT is being used. Note that the IP addresses of both dCMDB 140 and the dCMBD of system 190 is 192.168.2.4, which will work without difficulty within their respective local network environments, but will present ambiguities for network 120.

Figure 2:
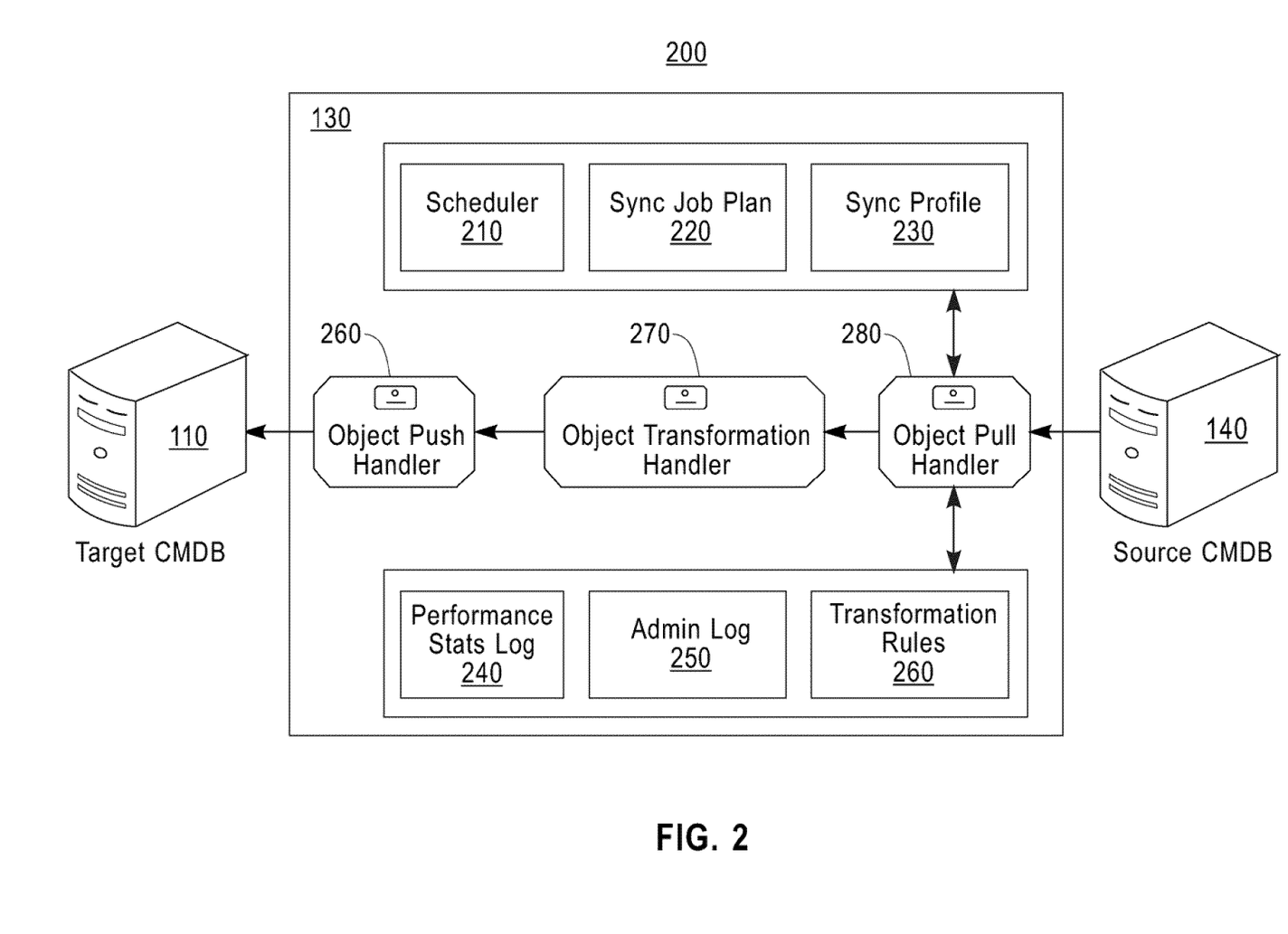
FIG. 2 shows the primary functional components of an exemplary custom synchronization system, according to an embodiment of the invention.

FIG. 2 shows the primary functional components of an exemplary custom synchronization system. Custom synchronization is used to transform data from one CMDB and place the results into another CMBD. FIG. 2 shows a system 200 comprised of the source CMDB 140, the target CMDB 110, and the custom synchronization function 130. The custom synchronization function 130 extracts data from the source CMDB and populates the target CMDB 110. The custom synchronization function 130 includes three handlers: an object pull handler 280, an object transformation handler 270, and an object push handler 260. The object pull handler 280 is responsible for "pulling", using the relevant APIs, data from a source CMDB. The object transformation handler 270 is responsible for transforming the data in accordance with a set of rules defined by the user. The object push handler 260 is responsible for "pushing", using the relevant APIs, data into the target CMDB.

According to one embodiment of the customs synchronization invention, all instances of the data and relationships are pulled, corresponding to a full synchronization of the source elements into the target. According to another embodiment of the invention, only a subset of the data and relationships which have changed since the last synchronization are pulled, corresponding to a incremental synchronization.

According to other embodiments of the invention, there are a variety of types of synchronization that the custom synchronization function 140 is able to perform, described as follows.

(1) Full synchronization: In this case the full set of server domain CMDB model objects will be extracted from the CMDB in a dCMDB domain to a central eCMDB.

(2) Incremental synchronization: In this case a subset of server domain CMDB model objects will be extracted from the CMDB in a dCMDB domain to a central eCMDB. The domain CMDB change manager information will be used to select only those model objects that have been changed since the last synchronization.

(3) Automatic Synchronization: Automatic synchronization embeds the synchronization function at the server in the dCMDB domain. The model objects are pushed to the eCMDB from the domain CMDB. It takes care of scheduling (triggered or time-based) and initial and incremental synchronization. For this purpose the eCMDB will maintain extra configuration data in each domain CMDB configuration object.

A custom synchronization function according to an embodiment of the invention is supported by a system that includes six sub-components: a scheduler 210, a synchronization job plan 220, a synchronization profile 230, a performance statistics log 240, an administration log 250, and a set of transformation rules 260. The scheduler 210 is responsible for invoking the handlers based on a previously defined schedule. The synchronization job plan 220 is a schedule file that provides details on the sets of CIs that are to be transformed. The synchronization profile 230 provides a profile definition of which CI types are to be transformed. The administration log 250 is a log of all transfer/transformations that take place. The transformation rules 260 define a set of rules as to what transformations are to be affected upon the CIs selected during a particular job plan.

Figure 3A:
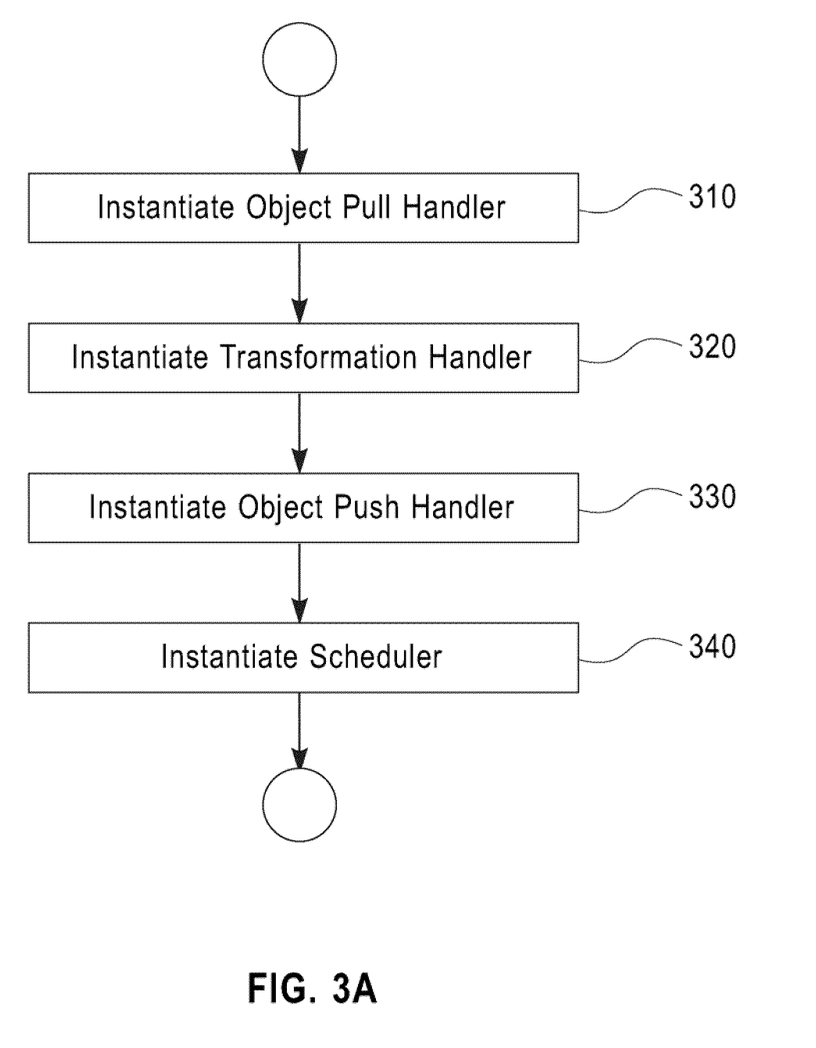
FIGS. 3(a)-(e) are flowcharts of an exemplary custom synchronization method of the system of FIG. 2, according to an embodiment of the invention.

FIGS. 3(a)-(e) are flowcharts of an exemplary custom synchronization method of the system of FIG. 2. Referring first to FIG. 3(a), the core objects are initialized in a main block 300 comprising of the steps of instantiating the object pull handler (step 310), instantiating the transformation handler (step 320), instantiating the object push handler (step 330), and instantiating the scheduler (step 340).

Figure 3B:
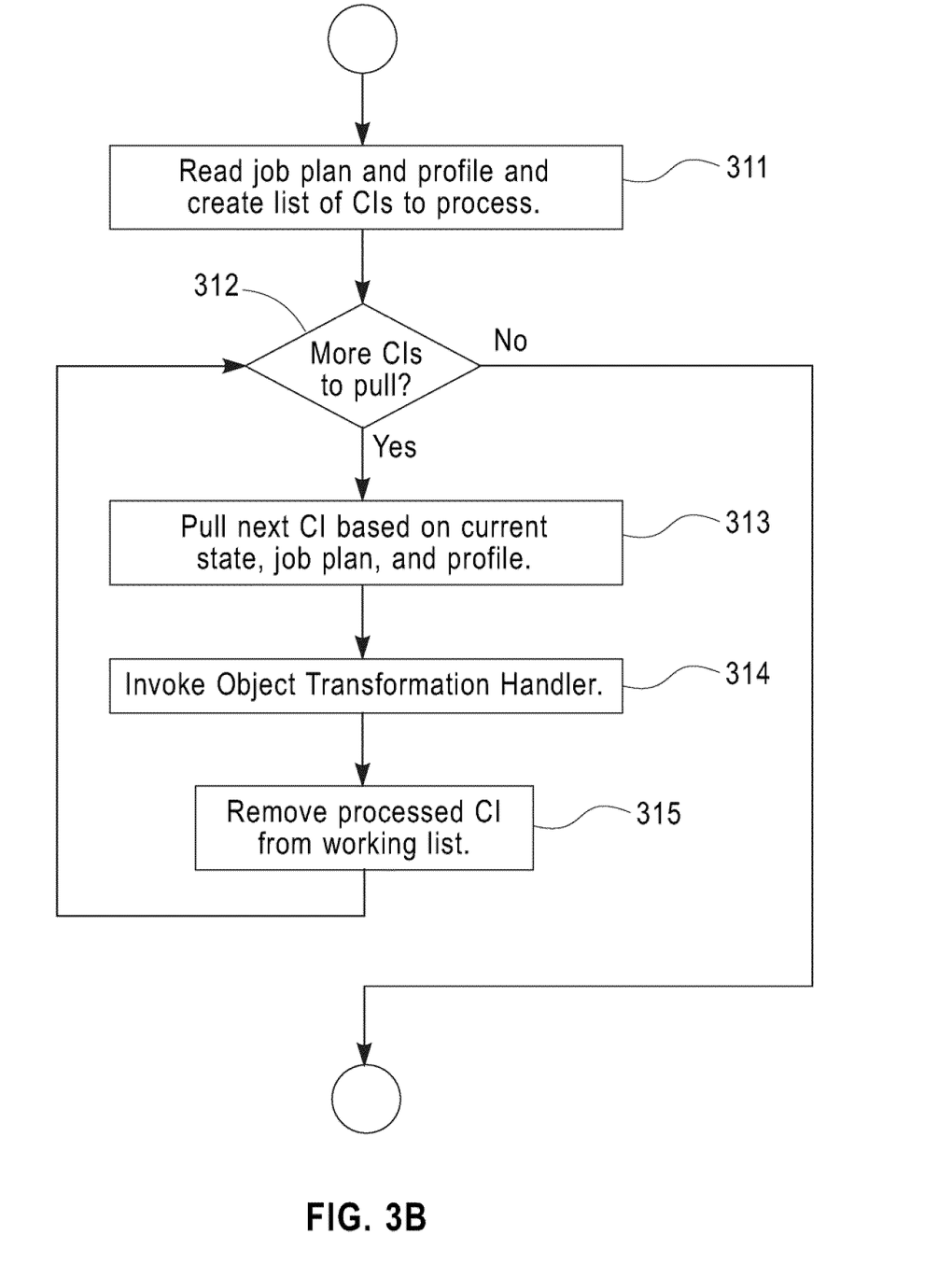
Figure 3C:
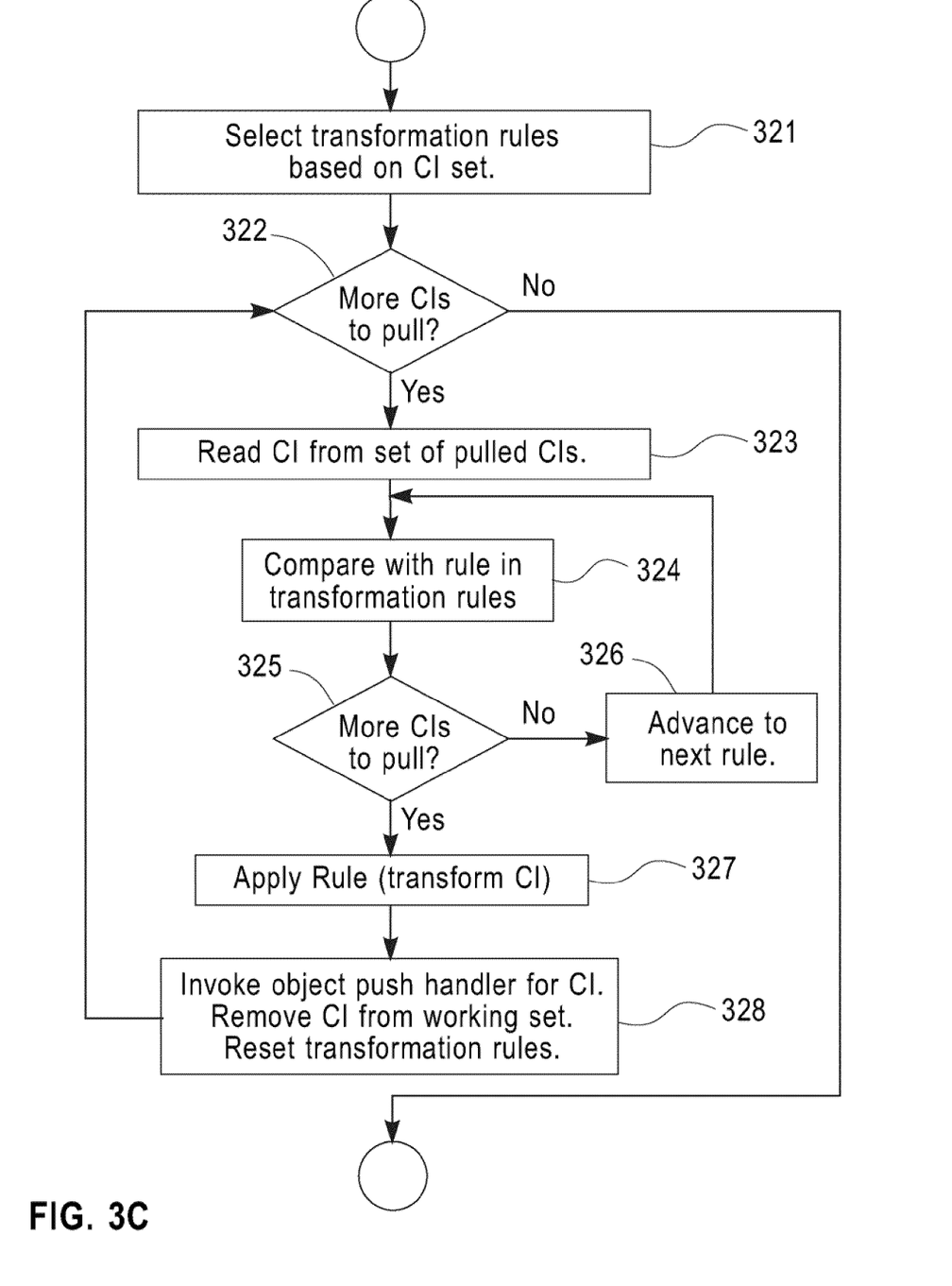
Figure 3D:
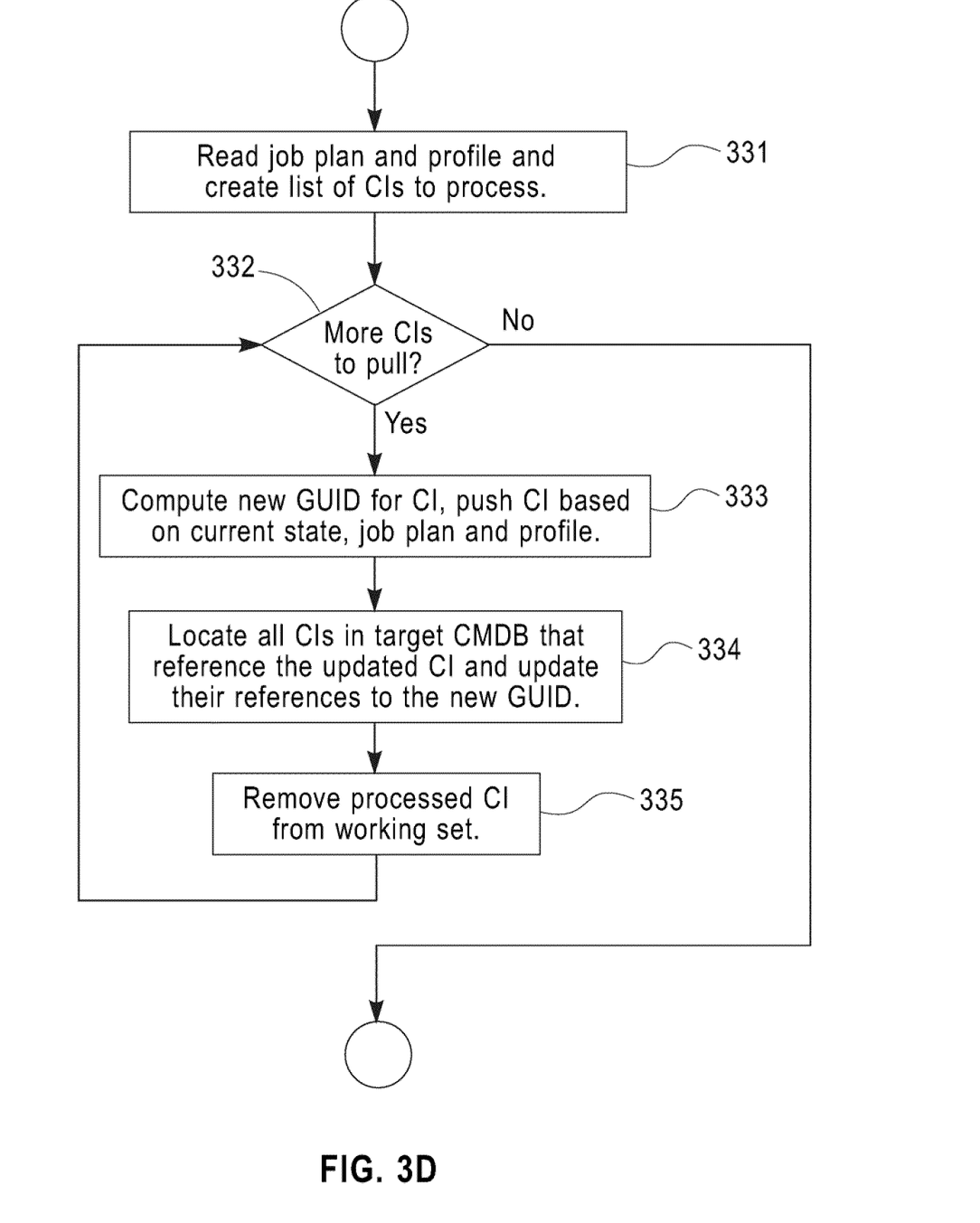
Figure 3E:
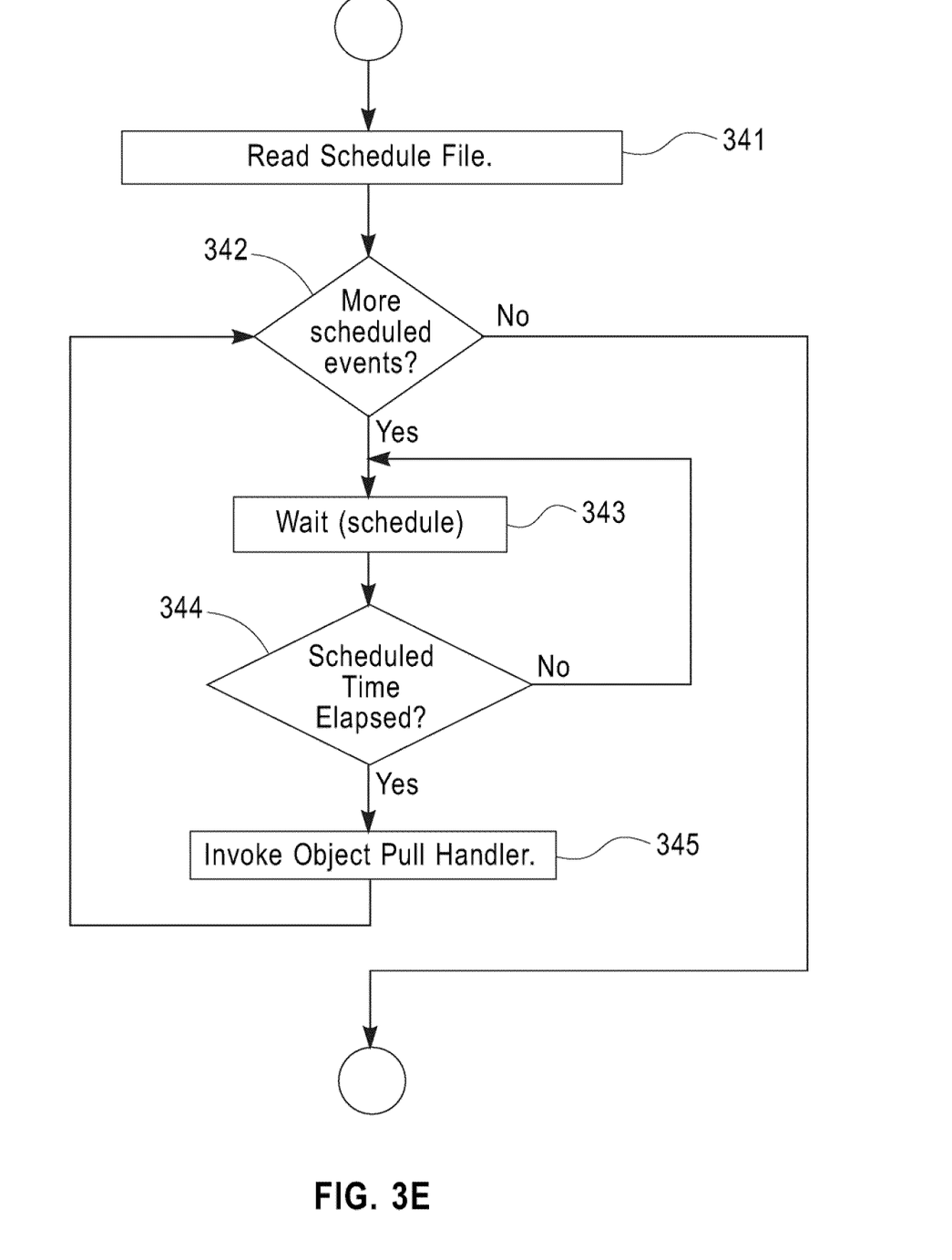

Referring next to FIG. 3(e), the scheduler first reads the schedule file at step 341, and if, at step 342, there are no scheduled events, goes into a cycle at steps 343 to 344 of waiting for the next scheduled event, for example, a timer trigger at a particular date/time. Once an event occurs, the scheduler then invokes at step 345 the object pull handler.

Referring now to FIG. 3(b), the object pull handler reads the job plan and profile at step 311 to create a list of CIs to be pulled for this event trigger. If, at step 312, there are no CIs to pull, the object pull handler exits. Otherwise, the object pull handler will construct a set of CIs to be processed based on this list according to the following steps. For each CI in the set of CIs the object pull handler issues the appropriate API calls to the dCMDB 140 at step 313 to extract a particular CI from its repository based on its current state, job plan and profile. The object pull handler then invokes the transformation handler at step 314. The object pull handler then removes the CI from its set of CIs to be processed at step 315, and returns to step 312 to check if there are more CIs in the set to be processed.

Figure 4:
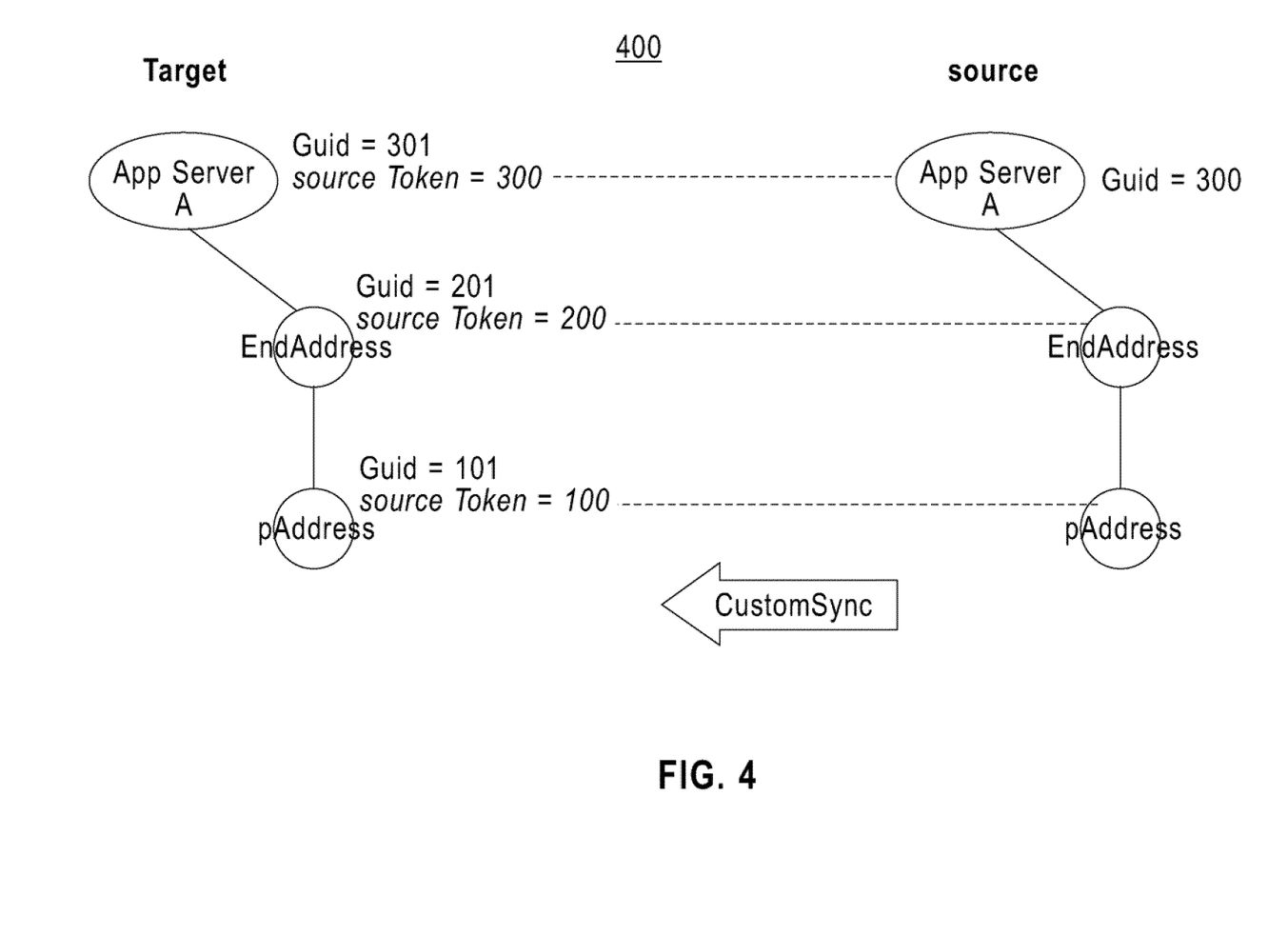
FIG. 4 depicts an exemplary transformation of globally unique identifiers (GUIDs) of the source CIs to new GUIDs when the CI is populated in the target CMDB, according to an embodiment of the invention.

Referring now to FIG. 3(c), the transformation handler examines the CI against a set of transformation rules. To do this, the transformation handler selects a set of transformation rules for the CI set based on the job plan and profile information at step 321. If, at step 322, there are no CIs to process, the transformation handler exits. Otherwise, at step 323, a CI is read from the set of pulled CIs. The CI is compared with a rule in the set of transformation rules at step 324, and if, at step 325, a match is detected between the CI and the transformation rules, that is, where a CI matches a certain criteria, the appropriate transformation rule is applied at step 327. For example, CIs that have IPAddress information need transformation of the IPAddress to make the address unique. The criteria on what transformations to apply can be specified as a policy. An example transformation is illustrated in FIG. 4, described below. If there is no match, the transformation handler advances to the next rule at step 326, and performs the comparison again at step 324. Once the transformation has been applied the transformation handler invokes at step 328 the object push handler to push the resulting transformed CI to the target CMDB, removed the CI from the working set of CIs, and resets the transformation rules. The transformation handler then returns to step 322 to check if there are more CIs to process.

When the object push handler is invoked it accesses the target CMBD using the appropriate APIs and pushes the transformed CI to the target CMDB. Referring now to FIG. 3(d), the object push handler reads the job plan and profile at step 331 to create a list of CIs to be processed. The object push handler next checks if there are CIs to push, at step 332. If not, the object push handler exits. Otherwise, as a part of the transformation, additional fields are populated in the target CI that provide information on the source CMDB 140. The target global unique identifier (GUID) is replaced at step 333 with one which is generated based on a combination of fields that are guaranteed to be unique for the eCMDB 110, and the CI is pushed based on its job plan, profile and current state. At step 334, the object push handler then locates all CI's in the target CMDB 110 that reference the updated CI and updates them. In particular, all CIs that refer to either the target CI by a candidate key in the source CMDB, or by GUID in the source CMDB will have their records updated in the target CMDB. At step 335, the CI is then removed from the working set of CIs which are to be transformed and pushed, and returns to step 332 to inspect its set to see if another CI should be pushed.

FIG. 4 illustrates an exemplary transformation of configuration items (CIs) in which the globally unique identifiers (GUIDs) of the source CIs is transformed to a new GUID when the CI is populated in the target CMDB. The figure illustrates one transformation that can be applied by a custom synchronization function according to an embodiment of the invention. On the right side of the figure, a set of configuration items have been identified within a domain in which the keys are unique within that domain only, for example, within a NAT environment. The left side of the figure shows how these CIs have been transformed so that they are now unique within an enterprise. In this instance the GUIDs have been changed, in which GUID 300 is transformed to 301, GUID 200 is transformed to 201, and GUID 100 is transformed to 101. The transformed CIs are augmented with additional information so that the source GUID is also stored, so that the source CI can be located within the original domain if needed. For example, GUID 301 is augmented with source token=300, GUID 201 is augmented with source token=200, and GUID 101 is augmented with source token=100.

Figure 5:
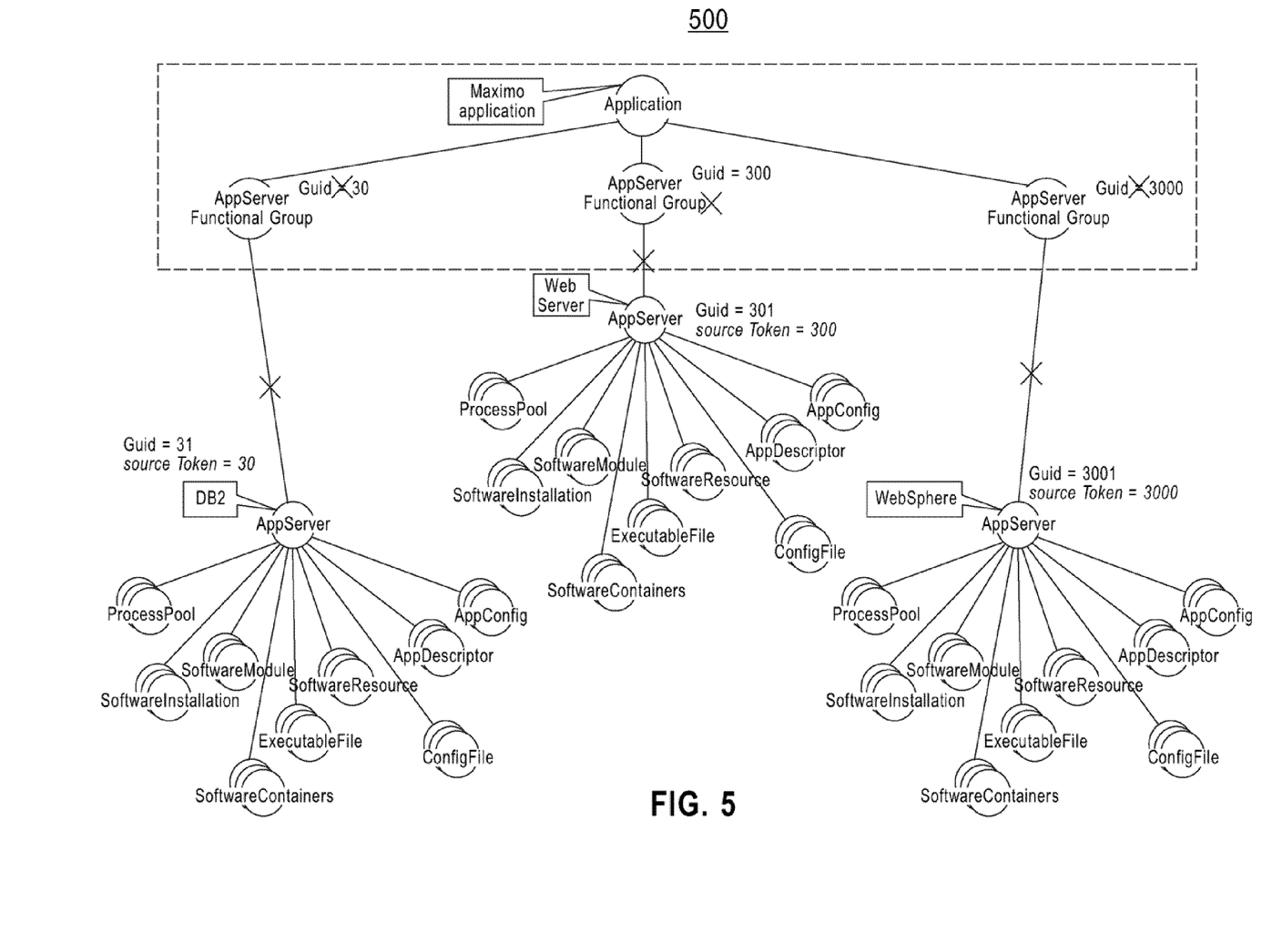
FIG. 5 shows how custom synchronization can be used to resolve integrity issues resulting from the deployment of CMDB within a NAT environment, according to an embodiment of the invention.

FIG. 5 illustrates how a custom synchronization according to an embodiment of the invention can be used to resolve integrity issues resulting from the deployment of a CMDB within a NAT environment. For example, the act of transforming CIs keys for objects that are copied to the enterprise CMDB also requires that all references to the objects must also be adjusted to ensure the data integrity of the resulting object model. FIG. 5 depicts a Maximo enterprise asset management application 500 with three application server functional groups 510, 502, 503. For each application server functional group 501, 502, 503, an application server 511, 512, and 513 is shown, respectively. The application server functional groups are grouped together in a dotted line box. In this exemplary system, application server 511 serves a database, application server 512 is a web server, and application server 513 is a WebSphere application server. Each of the application servers in turn hosts a plurality of various applications, as indicated by the overlapping circles, such as process pools, software modules, configuration files, software resources, executables, etc. Each application server functional group can include a plurality of application servers, however, for the sake of clarity, only one application server is depicted in the figure. Note that each application server functional group has a same GUID as the application server depicted in the figure.

Since only the application server functional groups are visible to the enterprise asset management application 500, no ambiguity arises concerning the GUIDs of the underlying application servers. FIG. 5 illustrates each application server having a transformed GUID, e.g., GUID 300 to GUID 301, GUID 30 to GUID 31, and GUID 3000 to GUID 3001. However, the application server functional group has not been updated with this information, resulting in an inconsistent object model, as indicated by the 'X's drawn through the functional group server GUID's and the connecting edges with the application servers themselves. For this to be corrected the transformation rules must be applied so that each object, as it is pulled, is inspected against the rules and rewritten based on the rules. In this case, for each application server with a transformed GIUD, the information regarding the transformed GUID is propagated up the tree representing the application organization until the application represented by a highest level node is reached, after which the transformed GUID information is propagated downward to each lower level application server functional group, to resolve all references to the transformed GUID.

Figure 6A:
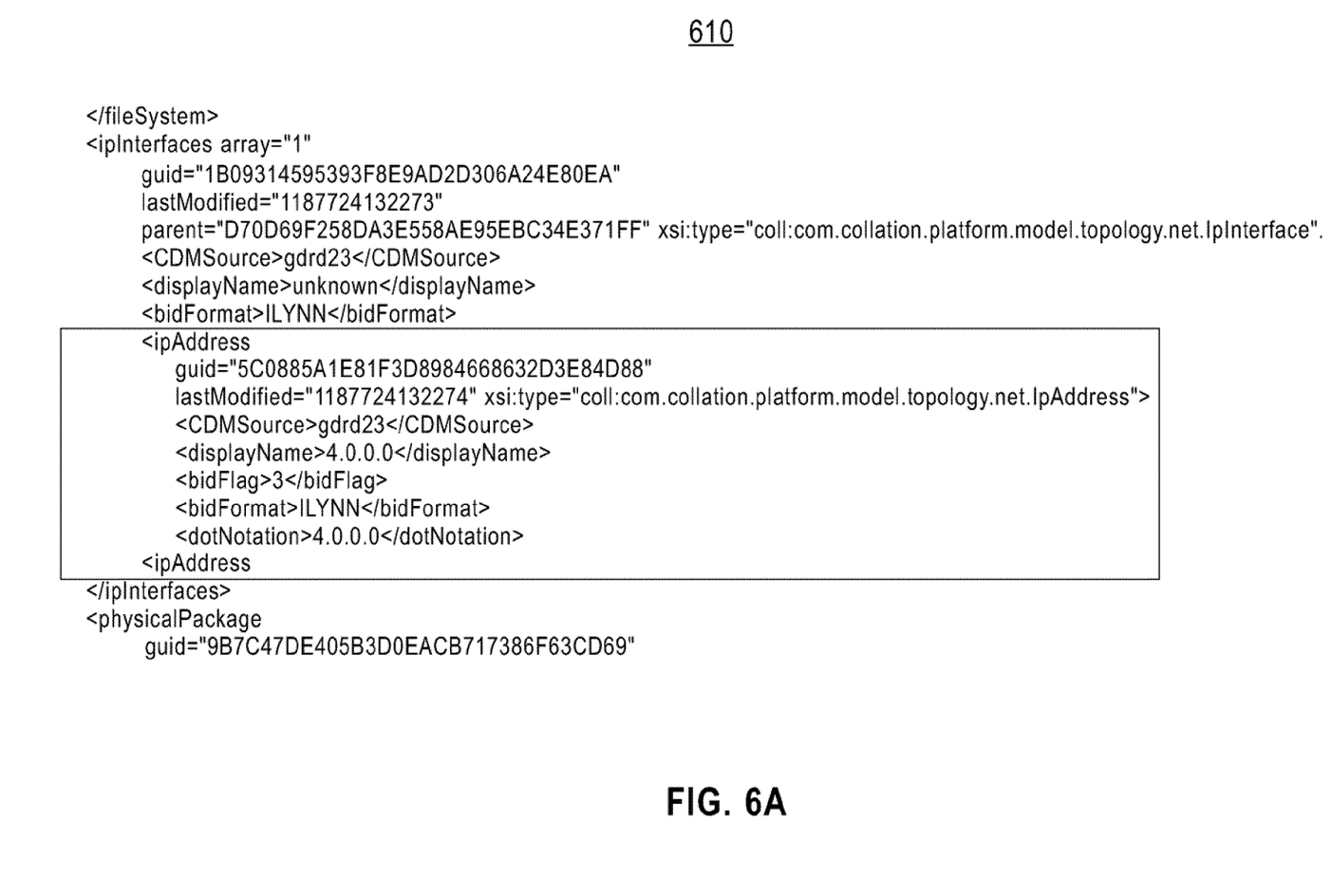
FIGS. 6(a)-(b) shows a representation of a CI defined by a schema and represented in the XML language that defines the fields of a CI before and after a transformation, according to an embodiment of the invention.
Figure 6B:
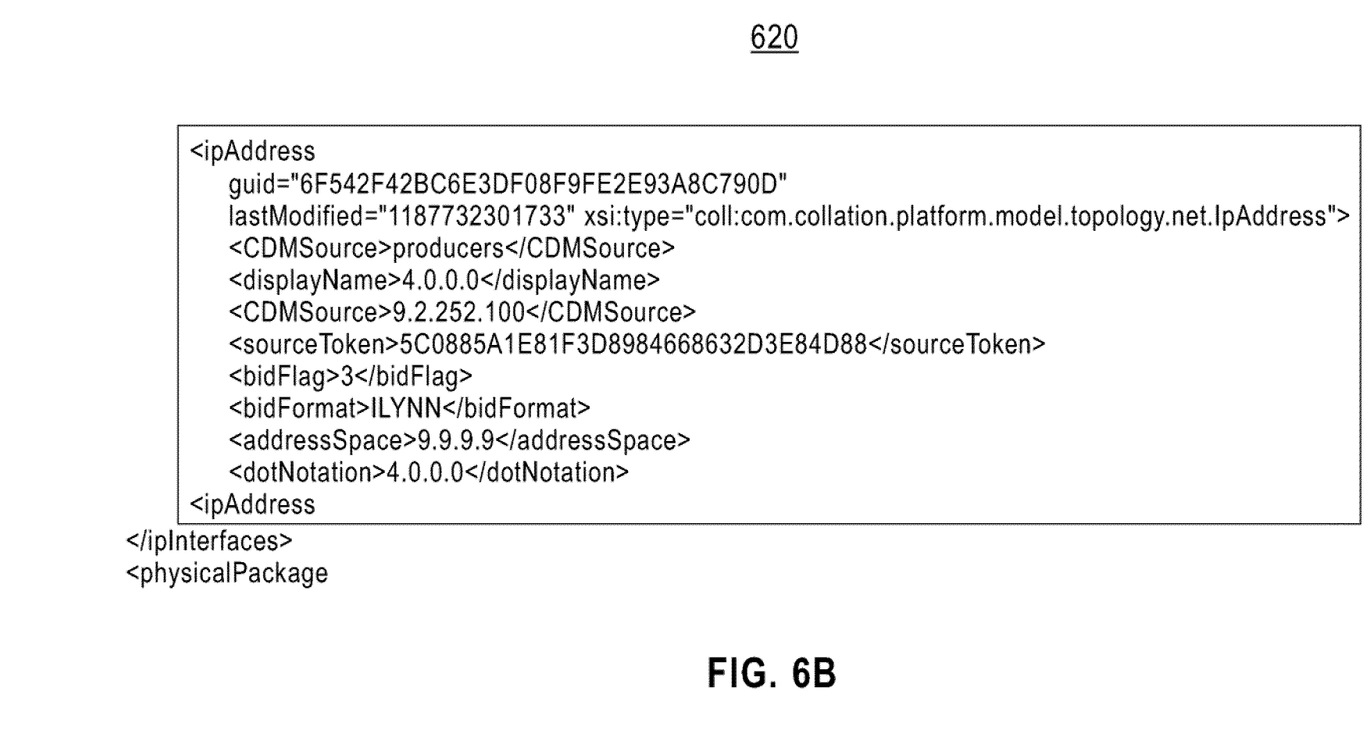

FIGS. 6(a)-(b) shows a representation of a CI defined by a schema and represented in the eXtensible Markup Language (XML) language that defines the fields of a CI before and after a transformation. The schema or CMDB schema is a representation of the logical and physical entities of infrastructure. The information stored in the CMDB is based on a consistent, integrated logical data model that defines the general characteristics of the data, how it is organized to correspond to real-world entities, and what relationships exist between the entities. This logical model, known as the "Common Data Model", is designed to represent management information in a way that is easy for consuming management applications. FIGS. 6(a)-(b) show the IP address information for a CI that is stored on the Source CMDB. As shown in FIG. 6(a), the IP address information is not unique at the enterprise level, with a stored value of 4.0.0.0. After application of the transformation handler, the CI stored in the target CMDB contains additional information within the CI representation. In particular, as shown in FIG. 6(b), the target CI contains the additional field <CDMSource> which provides the original location of the source CI, the additional field <SourceToken> which provides the original GUID and a new <guid> value which is computed based on the (unique) key fields of IP address and CDMSource. Note that as the CIs are transformed it is necessary to update in the Target CMDB all references to the Target. Otherwise the integrity of the target CMDB cannot be guaranteed.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture. Given the teachings provided herein, one of ordinary skill in the related art will be able to contemplate these and similar implementations or configurations of other embodiments of the present invention.

Figure 7:
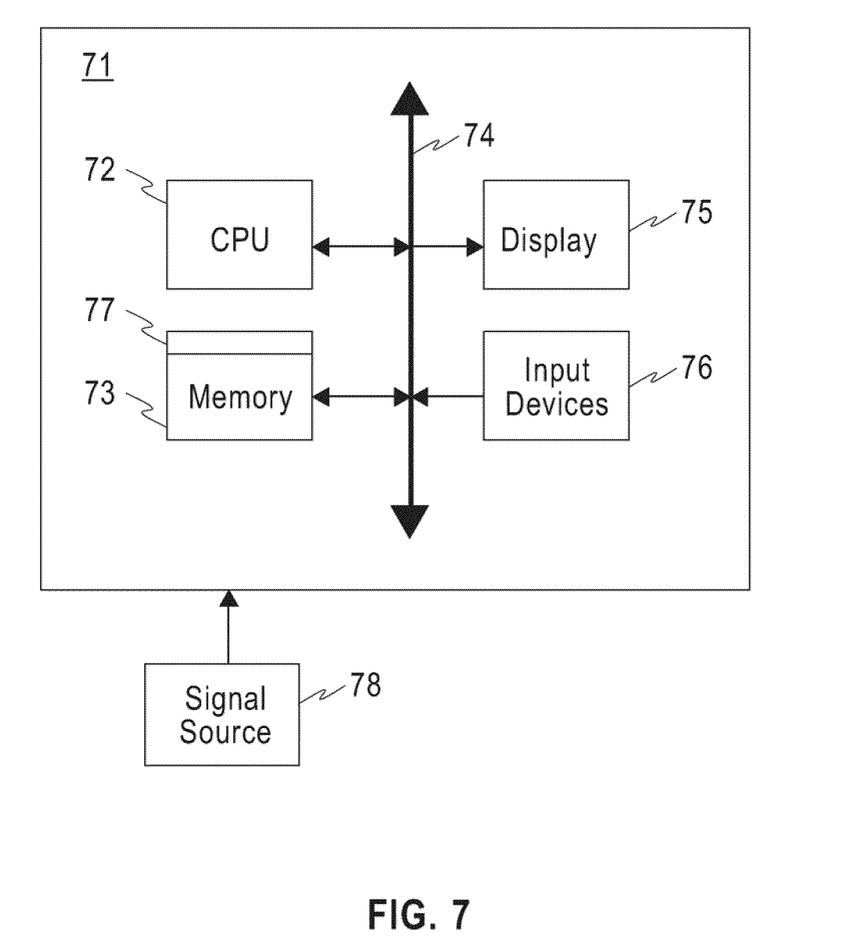
FIG. 7 is a block diagram of an exemplary computer system for implementing a method for transforming configuration items for quality and compliance purposes as they are loaded into a Configuration Management Database (CMDB), according to an embodiment of the invention.

FIG. 7 is a block diagram of an exemplary computer system for implementing a method for transforming configuration items for quality and compliance purposes as they are loaded into a Configuration Management Database (CMDB), according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:
1. A method for synchronizing identifiers of information technology (IT) infrastructure configuration items (CIs) in an enterprise configuration management database, the method comprising:
   providing a plurality of CIs extracted from a plurality of domain-specific configuration management databases (dCMDBs) that comprise an enterprise configuration management database (eCMDB);
   applying a set of transformation rules to the CIs that augment identifiers of each of the plurality of CIs with scoping information on the dCMDB from which the CI was extracted, wherein a domain-specific identifier for each of the plurality of CIs is replaced with an enterprise identifier based on a combination of fields that are guaranteed to be unique for the target eCMDB;
   wherein for each dCMDB with an augmented CI, information regarding the augmented CI is propagated up a tree representing the eCMDB until a highest level node is reached, then propagating the augmented CI downward to each lower level dCMDB, to resolve all references to the augmented CI;
   locating all CI's in the eCMBD that reference the augmented CI and updating the located CI's to replace the domain-specific identifier for the augmented CI with the unique enterprise identifier for the augmented CI; and
   synchronizing only those CIs in a dCMDB that have changed since a previous synchronization with the eCMDB.

2. The method of claim 1, wherein each of the plurality of CIs is defined by a schema and represented by an eXtensible Markup Language (XML) file, and wherein augmenting said CI comprises adding records to said XML file.

3. The method of claim 1, further comprising storing a globally unique identifier of each augmented CI in said eCMDB, wherein the augmented CI is locatable within the eCMDB.

4. The method of claim 1, wherein applying a set of transformation rules comprises:
   reading a job plan that provides details on those CIs to be transformed;
   pulling from a source configuration management database (CMDB) a CI for transformation;
   comparing said CI to one of said one or more transformation rules;
   applying one or more transformation rules to said CI, if said CI matches said transformation rules based on said job plan and a profile definition of which CI types are to be transformed; and
   pushing said transformed CI onto a target CMDB.

5. The method of claim 4, wherein a dCMDB automatically synchronizes its CIs with the eCMDB, wherein transformed CIs are pushed to the eCMDB from the dCMDB, wherein eCMDB maintains extra configuration data in each dCMDB CI.

6. The method of claim 1, further comprising synchronizing all CIs in a dCMDB with the eCMDB.

7. A program storage device readable by a computer, tangibly embodying a program of instructions executable by the computer to perform the method steps for synchronizing identifiers of information technology (IT) infrastructure configuration items (CIs) in an enterprise configuration management database, said method comprising:
   providing a plurality of CIs extracted from a plurality of domain-specific configuration management databases (dCMDBs) that comprise an enterprise configuration management database (eCMDB);
   applying a set of transformation rules to the CIs that augment identifiers of each of the plurality of CIs with scoping information on dCMDB from which the CI was extracted wherein a domain-specific identifier for each of the plurality of CIs is replaced with an enterprise identifier based on a combination of fields that are guaranteed to be unique for the target eCMDB;
   wherein for each dCMDB with an augmented CI, information regarding the augmented CI is propagated up a tree representing the eCMDB until a highest level node is reached, then propagating the augmented CI downward to each lower level dCMDB, to resolve all references to the augmented CI;
   locating all CI's in the eCMBD that reference the augmented CI and updating the located CI's to replace the domain-specific identifier for the augmented CI with the unique enterprise identifier for the augmented CI; and
   synchronizing only those CIs in a dCMDB that have changed since a previous synchronization with the eCMDB.

8. The computer readable program storage device of claim 7, wherein each of the plurality of CIs is defined by a schema and represented by an eXtensible Markup Language (XML) file, and wherein augmenting said CI comprises adding records to said XML file.

9. The computer readable program storage device of claim 7, wherein the method further comprises storing a globally unique identifier of each augmented CI in said eCMDB, wherein the augmented CI is locatable within the eCMDB.

10. The computer readable program storage device of claim 7, wherein applying a set of transformation rules comprises:
   reading a job plan that provides details on those CIs to be transformed;
   pulling from a source configuration management database (CMDB) a CI for transformation;
   comparing said CI to one of said one or more transformation rules;
   applying one or more transformation rules to said CI, if said CI matches said transformation rules based on said job plan and a profile definition of which CI types are to be transformed; and
   pushing said transformed CI onto a target CMDB.

11. The computer readable program storage device of claim 10, wherein a dCMDB automatically synchronizes its CIs with the eCMDB, wherein transformed CIs are pushed to the eCMDB from the dCMDB, wherein eCMDB maintains extra configuration data in each dCMDB CI.

12. The computer readable program storage device of claim 7, the method further comprising synchronizing all CIs in a dCMDB with the eCMDB.

* * * * *